(12) United States Patent
Boshev (10) Patent No.: US 12,074,875 B2
(45) Date of Patent: Aug. 27, 2024

(54) DOMAIN-SPECIFIC ACCESS MANAGEMENT USING IP FILTERING

(71) Applicant: SAP SE, Walldorf (DE)

(72) Inventor: Stoyan Zhivkov Boshev, Sofia (BG)

(73) Assignee: SAP SE, Walldorf (DE)

( * ) Notice: Subject to any disclaimer, the term of this patent is extended or adjusted under 35 U.S.C. 154(b) by 305 days.

(21) Appl. No.: 17/588,748

(22) Filed: Jan. 31, 2022

(65) Prior Publication Data

US 2023/0247024 A1    Aug. 3, 2023

(51) Int. Cl.
*H04L 9/40* (2022.01)
*G06F 16/22* (2019.01)

(52) U.S. Cl.
CPC ........ *H04L 63/101* (2013.01); *G06F 16/2255* (2019.01)

(58) Field of Classification Search
CPC ............................ H04L 63/101; G06F 16/2255
See application file for complete search history.

(56) References Cited

U.S. PATENT DOCUMENTS

| | | | | |
|---|---|---|---|---|
| 8,060,927 B2* | 11/2011 | Engdahl | .................. | H04L 63/08 726/13 |
| 10,659,335 B1* | 5/2020 | Morris | .................... | H04L 43/50 |
| 10,965,716 B2* | 3/2021 | Walter | .................. | H04L 67/141 |
| 2008/0034073 A1* | 2/2008 | McCloy | .............. | H04L 63/0236 709/223 |
| 2015/0089625 A1* | 3/2015 | Swanson | ............. | H04L 63/0263 726/11 |
| 2016/0335259 A1* | 11/2016 | Ylönen | ............... | G06F 11/3079 |
| 2018/0019968 A1* | 1/2018 | Redekop | ............. | H04L 63/0236 |
| 2019/0052467 A1* | 2/2019 | Bettger | .................. | H04L 9/088 |
| 2019/0253438 A1* | 8/2019 | Yeh | ........................ | H04L 63/101 |

* cited by examiner

*Primary Examiner* — Kambiz Zand
*Assistant Examiner* — Afaq Ali
(74) *Attorney, Agent, or Firm* — Buckley, Maschoff & Talwalkar LLC (57) ABSTRACT

Systems and methods include reception of a request for access to a target domain, the request including a source Internet Protocol (IP) address, determination of whether the source IP address is one of a plurality of IP addresses indicated within stored first data, determination, if it is determined that the source IP address is one of the plurality of stored IP addresses, of whether the target domain is one of a plurality of domains indicated within stored second data, and forwarding, if it is determined that the source IP address is one of the plurality of stored IP addresses and the target domain is one of a plurality of domains indicated within stored second data, of the request to the target domain.

20 Claims, 6 Drawing Sheets

DOMAIN-SPECIFIC ACCESS MANAGEMENT USING IP FILTERING

BACKGROUND

Modern system landscapes consist of computing services provided by several geographically-distant computing systems. For example, applications and services may be deployed within on-premise data centers (which themselves may be located in disparate geographic locations) and within data centers provided by one or more infrastructure as-a-service (i.e., cloud) providers. A system landscape receives incoming client requests, routes the requests to one or more appropriate applications and services, and returns a response.

It is sometimes desirable to deny incoming client requests which originate from certain locations. For example, a service provider may be restricted from providing its services (e.g., strong encryption services) to clients located in a particular country. In order to satisfy this requirement, an Internet Protocol (IP) address of an incoming request is identified and compared against a list of IP addresses associated with the particular country. If the IP address of the request matches a listed IP address, the request is denied and the requested service is not provided to the requestor.

The foregoing approach requires regular update of both the countries/locations from which requests for a given service should be denied, as well as the IP addresses associated with those countries. Management of these details is difficult and error-prone, particularly in the case of system landscapes including multiple services and applications (i.e., target domains) which may be deployed or decommissioned at any time. Management errors may result in access being provided to clients in contravention of applicable contracts or laws, leading to potential civil or criminal liability.

The above-described systems do not allow for exceptions in cases where target domain access to an otherwise-denied request is desired. Moreover, any configuration errors (e.g., wrong countries, wrong IP addresses, wrong service) must be corrected manually, leading to lost productivity and potential additional errors. What is needed are systems to facilitate management of IP address-based access to one or more target domains.

DETAILED DESCRIPTION

The following description is provided to enable any person in the art to make and use the described embodiments. Various modifications, however, will be readily-apparent to those in the art.

According to some embodiments, a request is received including a source IP address and a target domain such as a cloud service or cloud application. The request is rejected if the source IP address is within a list of blocked IP addresses and the target domain is not in an exception list of target domains. If the source IP address is not within a list of blocked IP addresses, or if the target domain is in an exception list of target domains, the request is forwarded to the target domain. The above process may be performed by one or more cloud-based components such as a load balancer, a gateway, etc. Some embodiments thereby advantageously allow access to certain services or applications from otherwise-blocked IP addresses. The certain services or applications may handle authentication and/or security to the extent needed to suitably manage incoming requests from blocked IP addresses.

Some embodiments facilitate update of the list of blocked IP addresses and the list of target domains. For example, a user may edit either or both lists using an access management service. A configuration service compares the lists maintained by the access management service and periodically compares those lists to the lists used to inspect the request as described above. If any differences exist, the lists used to inspect the request are modified to conform to the lists maintained by the access management service.

In some embodiments, logs are generated to indicate the results of each request inspection as described above. A monitoring service may access the logs to determine whether each already-performed inspection was performed according to the list of blocked IP addresses and the list of target domains which should have been in effect at the time of the inspection. This determination may assist in the detection corruption or unauthorized activities.

Embodiments may also or alternatively integrate with lifecycle management of a target domain. For example, prior to deployment of (or subscription to) an application or service, an administrator may specify whether the application or service should be added to the list of exception domains. The administrator may also specify one or more countries and/or one or more IP addresses from which requests for the application or service should be denied. Then, during deployment of the application or service, the lists are updated based on the associated specifications.

Figure 1:
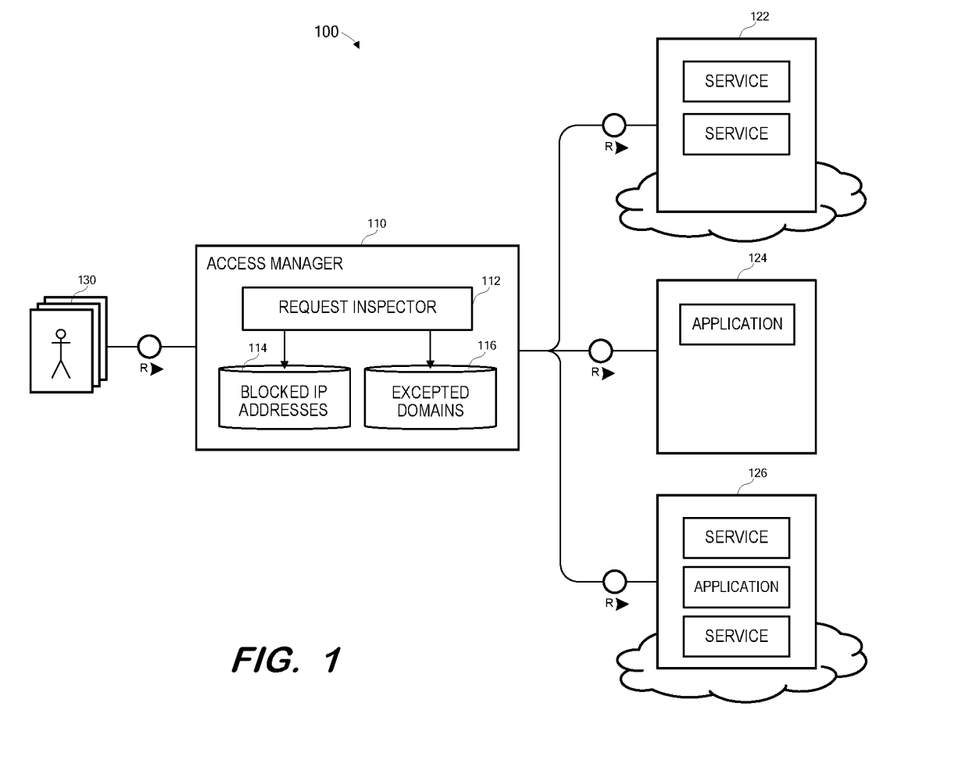
FIG. 1 is a block diagram of an architecture to manage access to heterogenous domains based on source IP address and target domain according to some embodiments.

FIG. 1 is a block diagram of architecture 100 according to some embodiments. The illustrated elements of architecture 100 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented using cloud-based resources, and/or other systems which apportion computing resources elastically according to demand, need, price, and/or any other metric.

Access manager 110 may comprise any combination of computing hardware and software suitable to provide request inspector 112 and to persist blocked IP addresses 114 and excepted domains 116. Request inspector 112 may comprise program code executable to cause access manager 110 to perform the functions attributed herein to request inspector 112. Generally, access manager 110 may provide an endpoint for requests intended for target domains with which access manager 110 is associated.

Each of systems 122, 124 and 126 provides one or more target domains which may be accessed via access manager 110 as described herein. Each of systems 122, 124, 126 and any other system mentioned herein may comprise an on-premise server, a cloud-deployed virtual machine, or any other suitable computing system to provide a software-based service. Each of systems 122, 124, 126 is depicted upon a cloud in order to represent their elasticity and their availability via Web communication protocols, but embodiments are not limited thereto. Access manager 110 may be similarly cloud-implemented.

Users 130 generate and transmit requests for services and/or applications of systems 122, 124 and 126. For example, a user 130 may operate a computing device to execute a Web browser and to input a Uniform Resource Locator (URL) associated with a domain of systems 122, 124 or 126. The Web Browser issues a request based on the URL which includes a source IP address of the computing device.

Architecture 100 is configured as is known in the art so that such requests are received by access manager 110. The requests may pass through any number of networks, gateways, etc. before their eventual receipt by access manager 110. Access manager 110 comprise a load balancer in some embodiments, with request inspector 112, blocked IP addresses 114 and excepted domains 116 comprising components of the load balancer. The load balancer may comprise an L7 load balancer in some embodiments. Embodiments may therefore leverage the ability of an L7 load balancer to determine the target domain of an incoming request and process the request based on the determined target domain.

Blocked IP addresses 114 includes data indicating a plurality of IP addresses. As described above, request inspector may compare the source IP address of an incoming request against all of the IP addresses indicated within blocked IP addresses 114 in order to determine whether or not to deny the request. Blocked IP addresses 114 may indicate the plurality of IP addresses in any suitable manner. For example, blocked IP addresses 114 may include a list of individual IP addresses and/or IP subnets, where an IP subnet represents all IP addresses within the IP subnet.

The IP addresses of blocked IP addresses 114 may be associated with particular organizations, governments, geographic locations (e.g., countries) or any other entity. In some embodiments, a provider of the services and applications of architecture 100 may wish to deny incoming requests which originate in a particular country. The provider may therefore determine IP addresses assigned to the particular country as is known in the art and store the determined IP addresses in blocked IP addresses 114. The IP addresses may be stored as one or more IP address subnets associated with the country.

Excepted domains 116 includes data indicating one or more target domains. An excepted domain is a domain to which an incoming request may be forwarded even if the source IP address of the incoming request is within blocked IP addresses 114. For example, an excepted domain may comprise a humanitarian service or application. Accordingly, even if an incoming request includes a source IP address associated with an embargoed country (for example), the incoming request is allowed to proceed to the target domain. The domains indicated within excepted domains 116 may be stored therein by a provider of the services and applications of architecture 100 based on contractual, legal, and/or other requirements.

Figure 2:
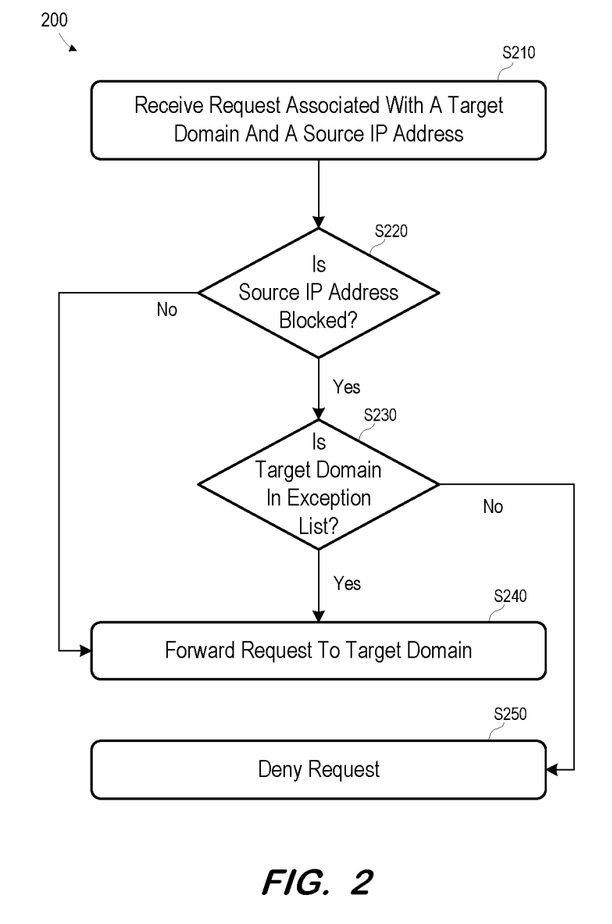
FIG. 2 comprises a flow diagram of a process to manage access to heterogenous domains based on source IP address and target domain according to some embodiments.

FIG. 2 comprises a flow diagram of process 200 according to some embodiments. Process 200 may be performed by request inspector 112 of access manager 110, but embodiments are not limited thereto. Process 200 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 200 begins at S210, at which a request is received. The request is associated with a target domain and a source IP address. The request may comprise a HyperText Transfer Protocol (HTTP) request including a URL associated with the target domain. The request may be issued by a Web browser of a user as described above, by another application or service, or by another system.

The request may be received at S210 by a load balancer which is associated with the target domain. The load balancer may execute a script which causes the load balancer to execute process 200. Request inspector 112 of FIG. 1 may comprise an implementation of such a script.

At S220, it is determined whether the source IP address is blocked. The determination at S220 may comprise a determination of whether the source IP address is one of a plurality of source IP addresses which have been previously designated as blocked. In some embodiments, the plurality of blocked source IP addresses are identified in a prestored list which is accessed during S220. Blocked IP addresses 114 is an example of such a list, and may be implemented by volatile or persistent memory accessible to the aforementioned load balancer. As described above, the list may include individual IP addresses as well as IP address subnets, or ranges. S220 may therefore comprise determination of whether the source IP address is identified within blocked IP addresses 114.

If the determination at S220 is negative, the request is forwarded to the target domain at S240. The target domain then operates to process the request according to its particular logic, which may or may not include issuing a response to the request. Generally, once the request is forwarded at S240, processing of the request by process 200 terminates.

Flow proceeds from S220 to S230 if the determination at S220 is affirmative. At S230, it is determined whether the target domain is in an excepted target domain. S230 may comprise accessing a list of excepted target domains. The list may comprise identifiers (e.g., URLs) of applications and/or services which are capable of performing sufficient authorization of requests associated with blocked IP addresses, but embodiments are not limited thereto. Excepted domains 116 is an example of such a list and may be implemented by volatile or persistent memory. Either or both lists of blocked IP addresses and excepted domains may be dynamically maintained in some embodiments as will be described below.

If the target domain is an excepted domain, flow proceeds to S240 to allow the request to reach the target domain as described above. If not, flow proceeds to S250. At S250, the request is denied. For example, access manager 110 may respond to the incoming request with an HTTP response including error status code 451 (i.e., "Unavailable For Legal Reasons").

According to some embodiments, a request inspector first determines whether the target domain of an incoming request is indicated within the exception list. If so, the request is forwarded to the target domain without any evaluation of the source IP address. If the target domain of the incoming request is not indicated within the exception list, it is then determined whether the source IP address is blocked. The request is forwarded to the target domain if the source IP address is not blocked and is denied if the source IP address is blocked. Such an embodiment may be more efficient than process 200 in a case that the number of target domains is small relative to the number of blocked IP addresses.

Figure 3:
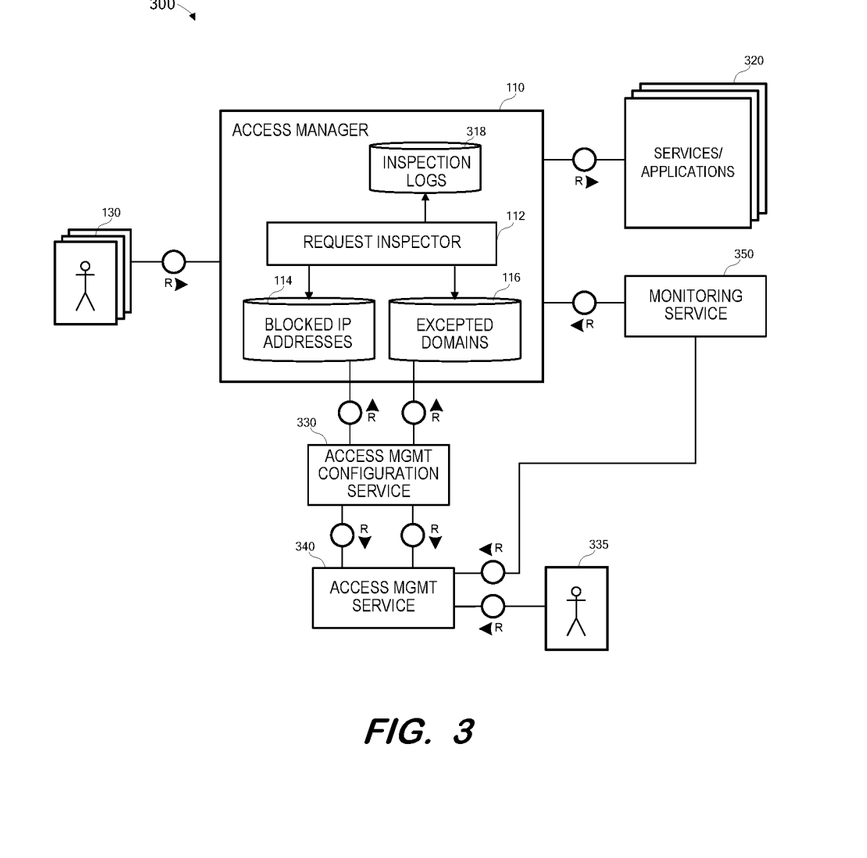
FIG. 3 is a block diagram of an architecture to configure and manage access to heterogenous domains based on source IP address and target domain according to some embodiments.

FIG. 3 is a block diagram of architecture 300 according to some embodiments. Architecture 300 may comprise an implementation of architecture 100 according to some embodiments.

Architecture 300 includes access manager 110 as described above. Access manager 110 of architecture 300 includes inspection logs 318. Inspection logs 318 include data describing the inspections of incoming requests performed by request inspector 112. For example, inspection logs 318 may include a record associated with each incoming request. The record may indicate a source IP address of the request, a target domain of the request, and whether the request was denied or permitted to reach the target domain. Inspection logs 318 may be stored in any storage device which can be accessed by access manager 110. Usage of inspection logs 318 according to some embodiments will be described below.

Services/applications 320 represented various target domains, such as those represented by systems 122, 124 and 126 of architecture 100. Accordingly, each of services/applications 320 may be provided by an on-premise server, a cloud-deployed virtual machine, a combination thereof, or any other suitable computing system to provide a software-based service.

As described above, blocked IP addresses 114 indicate a plurality of IP addresses from which incoming requests may be denied. Moreover, excepted domains 116 specify one or more target domains to which an incoming request may be forwarded even if the source IP address of the incoming request is within blocked IP addresses 114. According to the embodiment of FIG. 3, access management configuration service 330 maintains the contents of both blocked IP addresses 114 and of excepted domains 116.

Access management configuration service 330 may periodically check and, if necessary, update the contents of blocked IP addresses 114 and excepted domains 116. For example, access management configuration service 330 may compare the stored data of blocked IP addresses 114 and excepted domains 116 against data stored by access management service 340 and, if differences are identified, update blocked IP addresses 114 and excepted domains 116 to match the stored data.

Access management service 340 may store "master" lists (not shown) of blocked IP addresses and excepted domains in any suitable storage system. Access management service 340 provides an interface to users such as administrator 335 which allows administrator 335 to view and modify the lists of blocked IP addresses and excepted domains stored by access management service 340. For example, administrator 335 may operate a Web browser to access the lists and modify the lists as desired (e.g., to add blocked IP addresses associated with a newly-embargoed country, to remove an excepted domain associated with a deprecated service). Such user access may require authentication as is known in the art.

In some embodiments, access management configuration service 330 regularly polls access management service 340 for the content of each maintained list. Access management service 340 may provide a separate API usable by access management configuration service 330 to poll each respective list. The lists may be polled every hour or according to any other suitable interval.

Monitoring service 350 may ensure that blocked IP addresses 114 and excepted domains 116 are consistent with the lists maintained by access management service 340. For example, monitoring service 350 may access inspection logs 318 to determine whether logged processing of incoming requests by request inspector 112 was consistent with the expected content of blocked IP addresses 114 and excepted domains 116 at the time each incoming request was received. The expected content is the content of the above-mentioned master lists maintained by access management service 340.

In one example, monitoring service 350 accesses a record of inspection logs 318 to identify an incoming request and its reception time, source address, target domain, and disposition (e.g., denied, allowed). Monitoring service 350 communicates with access management service 340 to determine whether, at the reception time, the source address or the target domain were identified in the respective lists maintained by the access management service 340. Monitoring service 350 then determines whether the disposition of the incoming request was consistent with the respective lists. For example, if the source address was identified in the blocked IP address list and the target domain was not in the excepted domain list, monitoring service 350 would determine that a disposition of "denied" is consistent and a disposition of "allowed" is inconsistent.

Inconsistent dispositions may indicate tampering with access manager 110. The tampering may consist of unauthorized modification of blocked IP addresses 114 or excepted domains 116. Tampering may also or alternatively affect request inspector 112 such that it no longer properly executes the inspection algorithm as described herein.

Monitoring service 350 may poll logs 318 on a periodic basis. For efficiency, such polling may include identifying only those records which are associated with denied requests in some embodiments.

Figure 4:
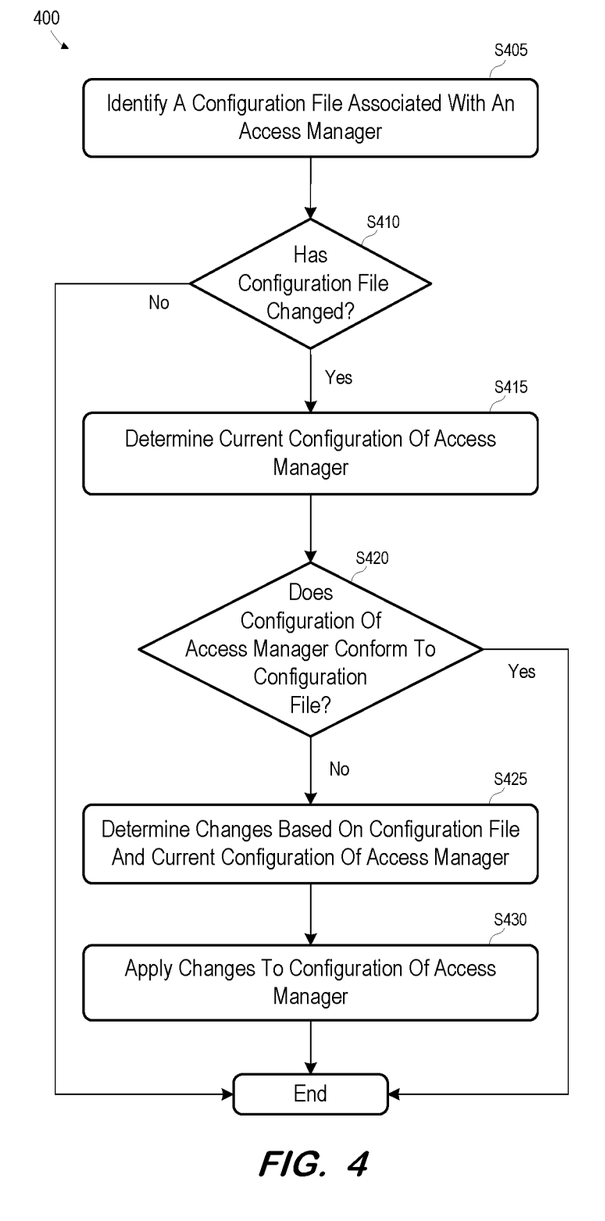
FIG. 4 comprises a flow diagram of a process to configure access to heterogenous domains based on source IP address and target domain according to some embodiments.

FIG. 4 is a flow diagram of process 400 to update a list of blocked IP addresses and/or a list of excepted domains used by an access manager according to some embodiments. Process 400 may be performed by access management configuration service 330 but embodiments are not limited thereto.

At S405, a configuration file associated with an access manager is identified. For purposes of the present description, a configuration file may include a list of blocked IP addresses, a list of excepted domains, or both lists. The configuration file may be maintained by access management service 340. In this regard, access management service 340 may maintain configuration files which are each respectively associated with one of several access managers, each of which receives incoming requests destined for a respective set of target domains. Access management configuration service 330 may therefore manage the configuration of more than one access manager, and S405 includes identification of a configuration file associated with a particular access manager of interest.

Execution of S405 may be triggered by a polling schedule. Polling may occur every day, hour, etc. If access management configuration service 330 manages the configuration of more than one access manager, S405 may be triggered for one access manager according to a first schedule (e.g., 5 min after the beginning of each hour) and for another access manager according to a second schedule (e.g., 10 min after the beginning of each hour).

At S410, it is determined whether the configuration file has changed since a last update. According to some embodiments, each update results in generation and storage of a hash of the current configuration file. Therefore, S410 consists of generating a hash of the configuration file identified at S405 and comparing the hash to the hash generated at the previous update. Process 400 terminates (e.g., until re-triggered according to a polling schedule) if it is determined at S410 that the configuration has not changed.

Flow proceeds to S415 if it is determined at S410 that the configuration file has changed. At S415, a current configuration of the access manager is determined. In one example of S415, access management configuration service 330 accesses corresponding APIs of access manager 110 to determine the contents of the list(s) of interest (i.e., blocked IP addresses 114 and/or excepted domains 116) as stored by access manager 110. It should be noted that the current configuration may have been determined at S410 if required by the particular implementation of S410 to determine whether the configuration has changed.

At S420, it is determined whether the determined current configuration of the access manager conforms to the configuration file identified at S410. S420 may comprise determining whether the blocked IP addresses (and/or excepted domains) identified by the current configuration are identical to the blocked IP addresses (and/or excepted domains) identified by the configuration file determined at S410. If so, process 400 terminates. If not, flow proceeds to S425.

At S425, changes are determined based on the configuration file and the current configuration of the access manager. S425 may comprise determining differences between the configuration file and the current configuration, and determining what changes should be made to the current configuration so that no differences will exist once the changes are applied to the current configuration. The determined changes may include additions, deletions, and/or modifications of IP addresses or excepted domains.

Next, at S430, the determined changes are applied to the configuration of the access manager. In some embodiments, access management configuration service 330 uses appropriate APIs of access manager 110 to modify the contents of blocked IP addresses 114 or excepted domains 116 to make the determined changes thereto.

In some embodiments, administrator 335 may operate access management service 340 to update the configuration file and to submit a command to change the configuration of the access manager based on the updated configuration file. Access management configuration service 330 may then execute S425 and S430 in response.

Figure 5:
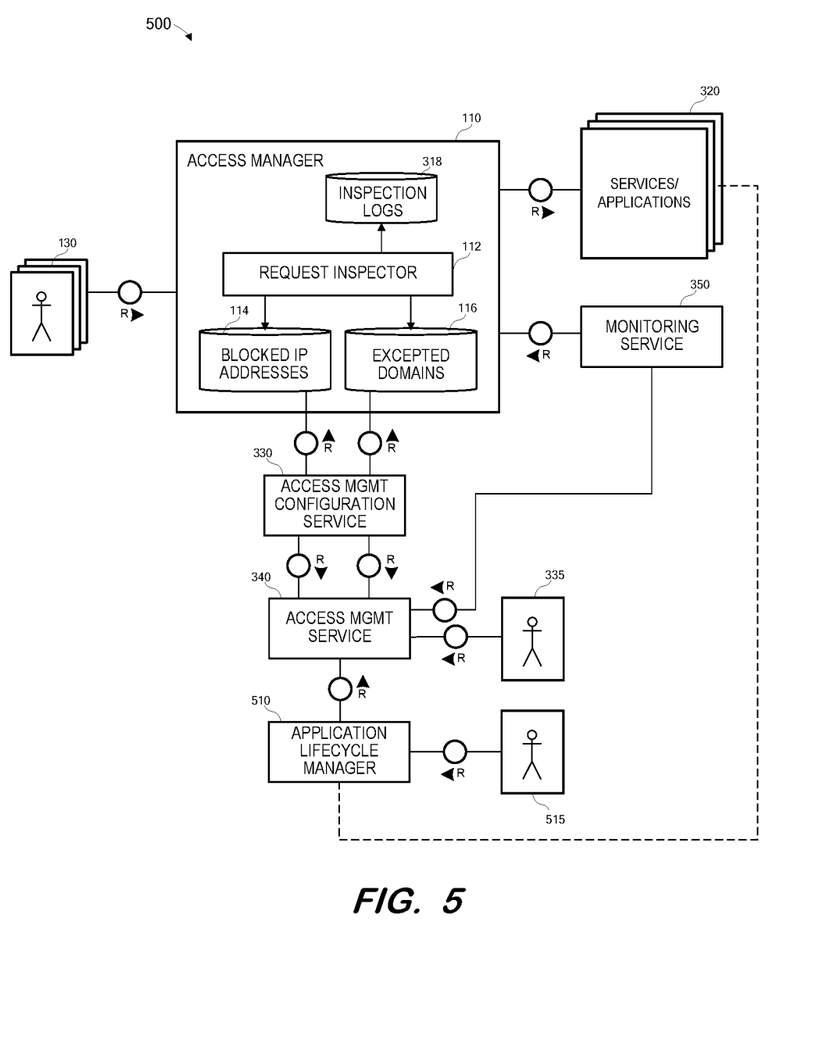
FIG. 5 is a block diagram of an architecture to configure and manage access to heterogenous domains based on source IP address and target domain according to some embodiments.

FIG. 5 is a block diagram of architecture 500 according to some embodiments. Architecture 500 may comprise an implementation of architecture 300 and/or architecture 100 according to some embodiments.

Architecture 500 includes access manager 110, services/applications 320, access management configuration service 330, access management service 340 and monitoring service 350, which may operate as described above. Architecture 500 also includes application lifecycle manager 510. As described below, application lifecycle manager 510 may facilitate configuration of the list of excepted domains 116 in the course of managing application deployments or subscriptions.

Administrator 515 may interface with application lifecycle manager 510 to configure deployment or undeployment of an application or service. Administrator 515 may also interface with application lifecycle manager 510 to initiate subscription to an existing deployed application or unsubscription from a deployed application or service. Such configurations are known in the art, and may include specifying a datacenter to which the application or service is to be deployed, a newly-subscribing tenant of the application or service, and other parameters.

According to some embodiments, configuration also includes providing a parameter to application lifecycle manager 510 which specifies that an application to be deployed is to be added to the list of excepted domains 116. Similarly, administrator 515 may interface with application lifecycle manager 510 to provide a parameter indicating that a subscription-specific domain should be added to the list of excepted domains 116.

During deployment of/subscription to an application or service, application lifecycle manager 510 not only deploys/subscribes to the application or service 320 (as indicated by the dashed line of FIG. 5), but also updates the master list of excepted domains maintained by access management service 330 to add the corresponding domain via a corresponding API. Similarly, during undeployment of/unsubscription from an application or service, application lifecycle manager 510 undeploys/unsubscribes from the application or service 320 and updates the master list of excepted domains maintained by access management service 330 to remove the corresponding domain.

Access management configuration service 340 may then operate as described above to periodically poll access management service 330 for changes to the master lists and to update excepted domains 116 of access manager 110 accordingly. As a result, the updates initiated by application lifecycle manager 510 eventually propagate to excepted domains 116. In some embodiments, application lifecycle manager 510 may directly trigger update of excepted domains 116 upon updating the master list of excepted domains as described above.

Figure 6:
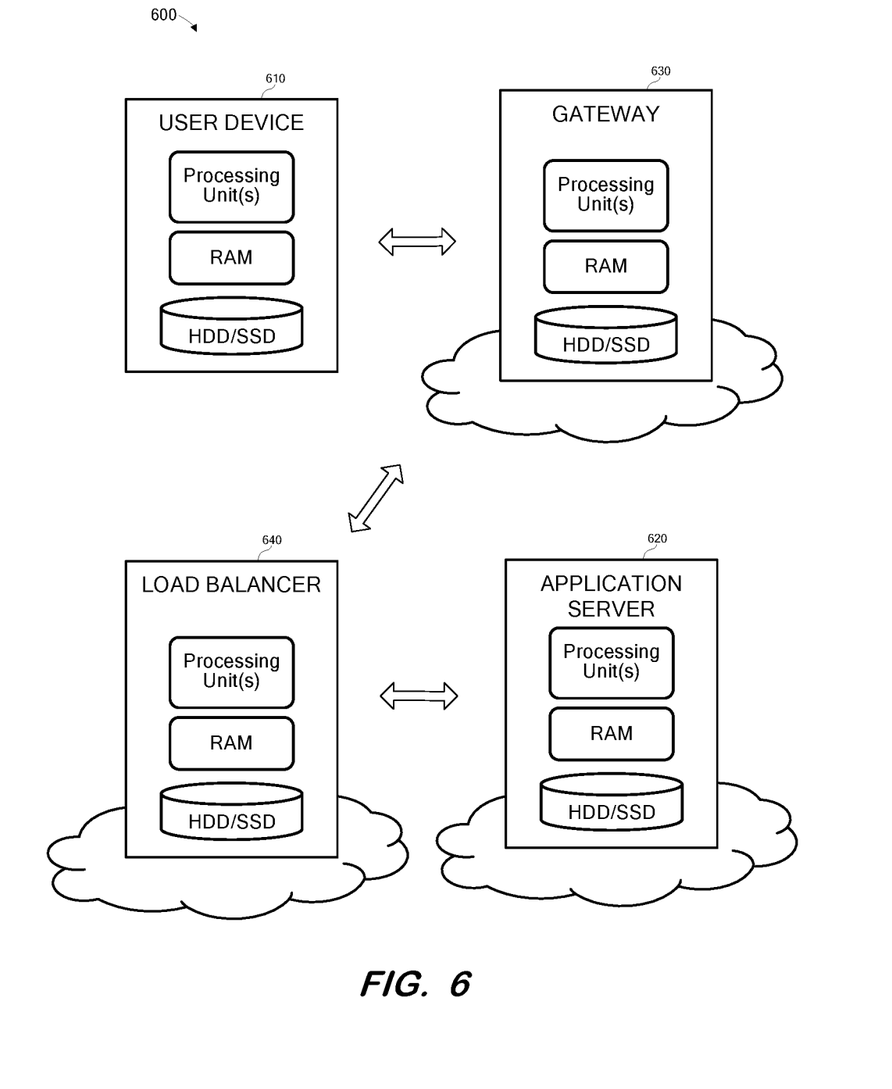
FIG. 6 is a block diagram of a cloud-based system according to some embodiments.

FIG. 6 illustrates cloud-based database deployment 600 according to some embodiments. In this regard, application server 620, gateway 630 and/or load balancer 640 may comprise cloud-based compute resources, such as virtual machines, allocated by a public cloud provider providing self-service and immediate provisioning, autoscaling, security, compliance and identity management features.

User device 610 may issue a request to a service or application executing on application server 620, for example via a Web Browser executing on user device 610. The request may be routed to gateway 630 according to Internet protocols, and from gateway 630 to load balancer 640. As is known in the art, load balancer 640 may operate to distribute incoming requests to a service or application among two or more servers independently executing the service or application.

In addition to its traditional functionality, load balancer 640 implements an access manager to inspect incoming requests as described herein. Generally, an incoming request is denied if it is associated with a blocked source IP address, unless the target domain of the incoming request is an excepted domain. Deployment 600 may also include systems providing a monitoring service, an access management configuration service, an access management service, and/or an application lifecycle manager as described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of architecture 100 may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A method comprising:
   receiving a request for access to a target domain, the request including a source Internet Protocol (IP) address;
   determining whether the source IP address is one of a plurality of IP addresses indicated within stored first data, the stored first data indicating the plurality of IP addresses are designated as a blocked IP address;
   in response to determining the source IP address is one of the plurality of stored IP addresses, determining whether the target domain is one of a plurality of domains indicated within stored second data, the stored second data indicating the plurality of domains are designated as an excepted target domain of at least one of an application and a service;
   in response to determining the source IP address is one of the plurality of IP addresses indicated within the stored first data and the target domain is one of a plurality of domains indicated within the stored second data, forwarding the request to the target domain;
   accessing a log record associated with the request, the log record indicating the source IP address, the target domain, and a disposition of the request;
   determining a second plurality of IP addresses of a stored third data at a time of the request and a second plurality of domains of a stored fourth data at the time of the request, the stored third data indicating the plurality of IP addresses designated as a blocked IP address at the time of the request and the stored fourth data indicating the plurality of domains designated as an excepted target domain of at least one of an application and service at the time of the request;
   evaluating the disposition of the request against the second plurality of IP addresses of the stored third data at the time of the request and the second plurality of domains of the stored fourth data at the time of the request;
   generating a first hash of the stored third data;
   comparing the first hash to a stored second hash corresponding to the stored first data; and
   in an instance the first hash is not identical to the stored second hash, updating the stored first data based on the stored third data.

2. A method according to claim 1, further comprising:
   in an instance it is determined that the source IP address is one of the plurality of stored IP addresses and the target domain is not one of a plurality of domains indicated within stored second data, denying the request.

3. A method according to claim 1, further comprising:
   generating a third hash of the fourth stored data;
   comparing the third hash to a stored fourth hash corresponding to the second stored data; and
   in an instance the third hash is not identical to the stored fourth hash, updating the second stored data based on the fourth stored data.

4. A method according to claim 3, further comprising:
   receiving an instruction to deploy an application associated with a first domain; and
   in response to receiving the instruction, adding the first domain to the second plurality of domains indicated within the stored fourth data.

5. A method according to claim 1, further comprising:
   receiving an instruction to deploy an application associated with a first domain; and
   in response to receiving the instruction, adding the first domain to the plurality of domains indicated within the stored second data.

6. The method of claim 1, wherein at least one of the application and the service designated as an excepted target domain in the stored second data is configured to authenticate the IP address of the request.

7. The method of claim 1, wherein the evaluating of the disposition of the request against the second plurality of IP addresses of the stored third data is performed at least periodically at a predefined time interval.

8. A non-transitory computer-readable medium storing program code executable by one or more processing units to cause a computing system to:
   receive a request for access to a target domain, the request including a source Internet Protocol (IP) address;
   determine whether the target domain is one of a plurality of domains indicated within stored first data, the stored first data indicating the plurality of IP addresses are designated as a blocked IP address;
   in response to determining the target domain is one of a plurality of domains indicated within stored first data, forward the request to the target domain;
   in response to determining the target domain is not one of the plurality of domains indicated within stored first data, determine whether the source IP address is one of a plurality of stored IP addresses indicated within stored second data, the stored second data indicating the plurality of domains are designated as an excepted target domain of at least one of an application and a service;
   in response to determining the target domain is not one of the plurality of domains indicated within stored first data and it is determined that the source IP address is one of the plurality of stored IP addresses indicated within the stored second data, deny the request;
   access a log record associated with the request, the log record indicating the source IP address, the target domain, and a disposition of the request;
   determine the second plurality of IP addresses of a stored third data at a time of the request and a second plurality of domains of a stored fourth data at the time of the request, the stored third data indicating the plurality of IP addresses designated as a blocked IP address at the time of the request and the stored fourth data indicating the plurality of domains designated as an excepted target domain of at least one of an application and service at the time of the request;
   evaluate the disposition against the second plurality of IP addresses of the stored third data at the time of the request and the second plurality of domains of the fourth stored data at the time of the request;
   generate a first hash of the stored third data;
   compare the first hash to a stored second hash corresponding to the stored second data; and
   in an instance the first hash is not identical to the stored second hash, update the stored second data based on the stored third data.

9. A medium according to claim 8, the program code executable by the one or more processing units to cause the computing system to:
   in an instance it is determined that the target domain is not one of the plurality of domains indicated within stored first data and it is determined that the source IP address is not one of the plurality of stored IP addresses indicated within stored second data, forward the request to the target domain.

10. A medium according to claim 8, the program code executable by the one or more processing units to cause the computing system to:
   generate a third hash of the fourth stored data;
   compare the third hash to a stored fourth hash corresponding to the first stored data; and
   if the third hash is not identical to the stored fourth hash, update the first stored data based on the fourth stored data.

11. A medium according to claim 10, the program code executable by the one or more processing units to cause the computing system to:
   receive an instruction to deploy an application associated with a first domain; and
   in response to receipt of the instruction, add the first domain to the second plurality of domains indicated within the stored fourth data.

12. A medium according to claim 8, the program code executable by the one or more processing units to cause the computing system to:
   receive an instruction to deploy an application associated with a first domain; and
   in response to receipt of the instruction, adding the first domain to the plurality of domains indicated within the stored first data.

13. The medium of claim 8, wherein at least one of the application and the service designated as an excepted target domain in the stored second data is configured to authenticate the IP address of the request.

14. A system comprising:
   one or more processing units; and
   a memory storing program code executable by the one or more processing units to cause the system to:
      receive a request for access to a target domain, the request including a source Internet Protocol (IP) address;
      determine whether the source IP address is one of a plurality of IP addresses indicated within stored first data, the stored first data indicating the plurality of IP addresses are designated as a blocked IP address;
      in response to determining the source IP address is one of the plurality of stored IP addresses, determine whether the target domain is one of a plurality of domains indicated within stored second data, the stored second data indicating the plurality of domains are designated as an excepted target domain of at least one of an application and a service;
      in response to determining the source IP address is one of the plurality of IP addresses indicated within the stored first data and the target domain is one of a plurality of domains indicated within the stored second data, forward the request to the target domain;
      access a log record associated with the request, the log record indicating the source IP address, the target domain, and a disposition of the request;
      determine a second plurality of IP addresses of a stored third data at a time of the request and a second plurality of domains of a stored fourth data at a time of the request, the stored third data indicating the plurality of IP addresses designated as a blocked IP address at the time of the request and the stored fourth data indicating the plurality of domains designated as an excepted target domain of at least one of an application and service at the time of the request;
      evaluate the disposition of the request against the second plurality of IP addresses of the stored third data at a time of the request and the second plurality of domains of the fourth stored data at the time of the request;
      generate a first hash of the third stored data;
      compare the first hash to a stored second hash corresponding to the stored first data; and in an instance the first hash is not identical to the stored second hash, update the stored first data based on the stored third data.

15. A system according to claim 14, the program code executable by the one or more processing units to cause the system to:
in an instance it is determined that the source IP address is one of the plurality of stored IP addresses and the target domain is not one of a plurality of domains indicated within stored second data, deny the request.

16. A system according to claim 14, the program code executable by the one or more processing units to cause the system to:
generate a third hash of the stored fourth data;
compare the third hash to a stored fourth hash corresponding to the stored second data; and
in an instance the third hash is not identical to the stored fourth hash, update the stored second data based on the stored fourth data.

17. A system according to claim 16, the program code executable by the one or more processing units to cause the system to:
receive an instruction to deploy an application associated with a first domain; and
in response to receiving the instruction, add the first domain to the second plurality of domains indicated within the stored fourth data.

18. A system according to claim 14, the program code executable by the one or more processing units to cause the system to:
receive an instruction to deploy an application associated with a first domain; and
in response to receiving the instruction, add the first domain to the plurality of domains indicated within the stored second data.

19. The system of claim 14, wherein at least one of the application and the service designated as an excepted target domain in the stored second data is configured to authenticate the IP address of the request.

20. The system of claim 14, wherein the evaluating of the disposition of the request against the second plurality of IP addresses of the stored third data is performed at least periodically at a predefined time interval.

\* \* \* \* \*